INVENTOR.
Richard S. Peugeot
ATTORNEY.

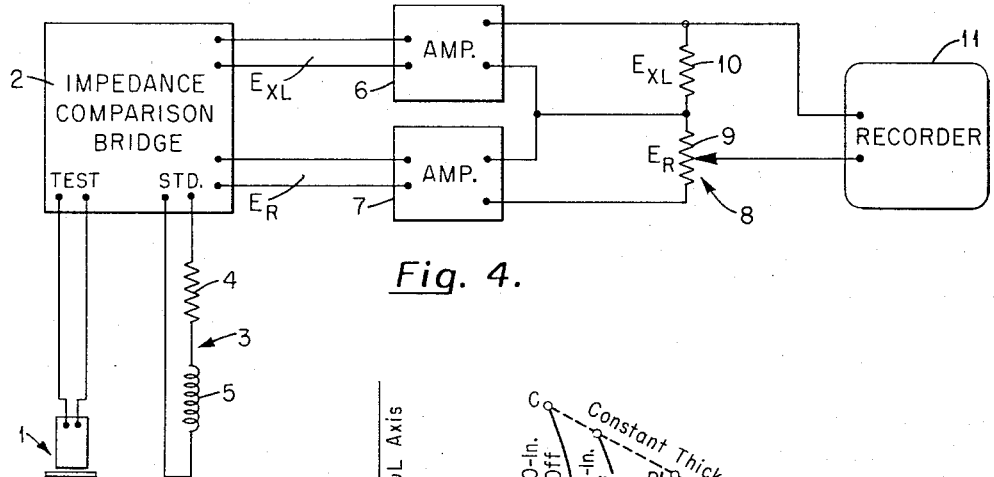
*Fig. 4.*
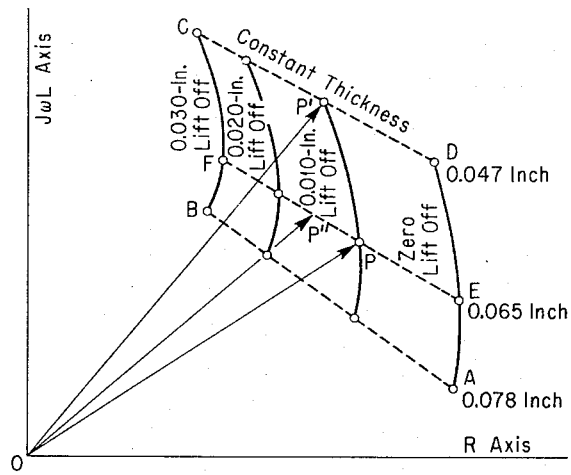
*Fig. 3.*
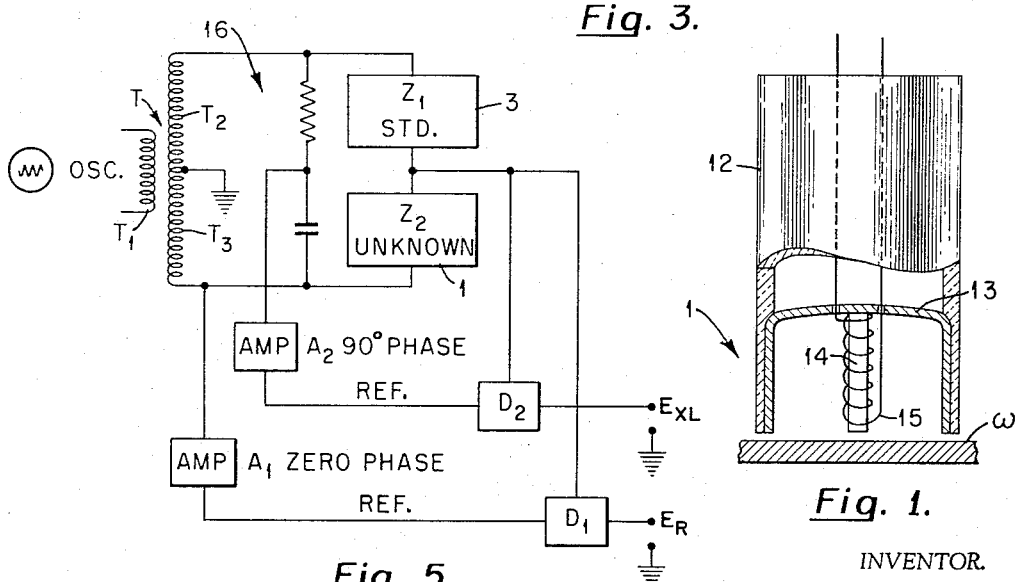
*Fig. 5.*
*Fig. 1.*
INVENTOR.
Richard S. Peugeot
BY
ATTORNEY.

United States Patent Office 3,358,225
Patented Dec. 12, 1967

3,358,225
LIFT-OFF COMPENSATION FOR EDDY CURRENT TESTERS
Richard S. Peugeot, Oak Ridge, Tenn., assignor to the United States of America as represented by the United States Atomic Energy Commission
Filed Mar. 27, 1964, Ser. No. 355,516
3 Claims. (Cl. 324—40)

ABSTRACT OF THE DISCLOSURE

An impedance bridge having a source of constant oscillations and voltage coupled thereto is utilized to compare the impedance of an eddy current probe, positioned in close proximity to a conductive sample under inspection, with a standard impedance to provide separated outputs of the reactive and resistive components of unbalance of the impedance bridge. Means are provided for selecting a predetermined portion of one of the outputs and combining it with the other output to provide a signal which is coupled to a read-out device for indicating the thickness of the sample under inspection. The selected, predetermined portion of said one output is such that the effect of slight variations in probe-to-sample spacing during inspection of the sample is minimized.

---

In eddy current testing of the non-contact type, it is common practice to position a probe coil close to an electrically conductive workpiece to determine, say, the thickness of the workpiece or for metallurgical testing. The probe coil is energized at a fixed voltage and a fixed frequency to establish an A.C. magnetic field which induces eddy currents in the workpiece. The eddy currents flowing in the conductive workpiece set up an eddy current magnetic field which weakens the magnetic field of the probe coil, reducing the impedance of the probe coil. The change in the impedance of the probe coil can be correlated quantitatively with one or more physical properties of the workpiece.

The probe coil is usually placed close to, but not in contact with, one surface of the workpiece under examination. In making measurements, a problem common to this art was encountered, i.e., the problem of minimizing the effect on the probe coil impedance of variations in the spacing between the probe coil and the workpiece. Where thickness is being measured, the shift in probe impedance is reflected in a change in the indicated thickness of the workpiece, although, of course, the thickness has not changed.

Applicant with a knowledge of these problems of the prior art has for an object of his invention the provision of a system for eddy current testing of conductive specimens which overcomes the effects of lift-off over a limited range.

Applicant has as another object of his invention the provision of an eddy current testing system wherein compensation for lift-off is affected by rotating the impedance plane.

Applicant has as a further object of his invention the provision of an eddy current tester which employs stretching one of the impedance axes to affect rotation of the impedance plane and provide lift-off compensation over a limited range.

Applicant has as a still further object of his invention the provision of an eddy current testing system wherein signals from a detector probe are broken into resistive and reactive components and portions of them are combined electrically in such a manner as to produce impedance plane orientation to compensate for lift-off over a limited range.

Other objects and advantages of my invention will appear from the following specification and the accompanying drawings, and the novel features thereof will be particularly pointed out in the annexed claims.

Figure 2:
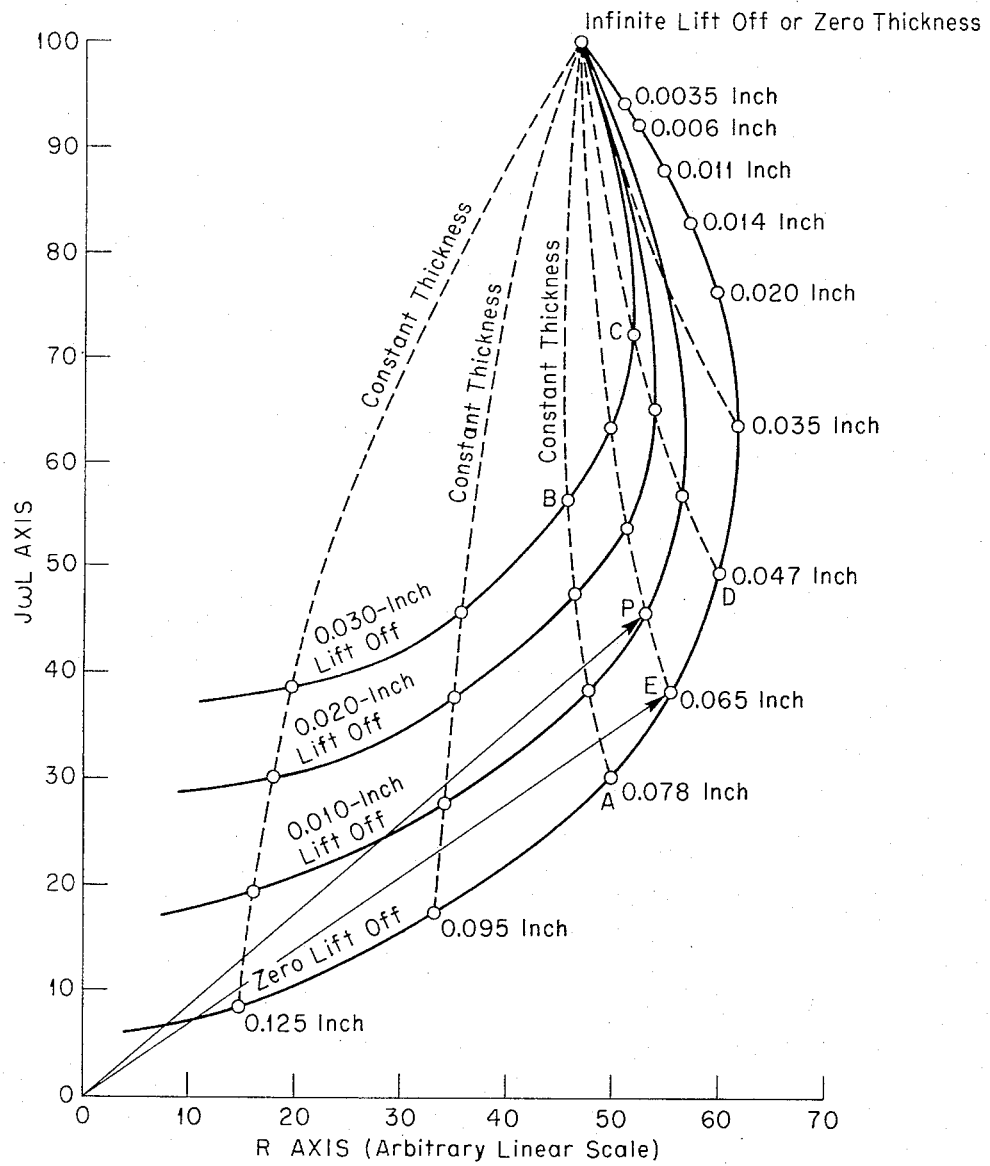
Figure 6:
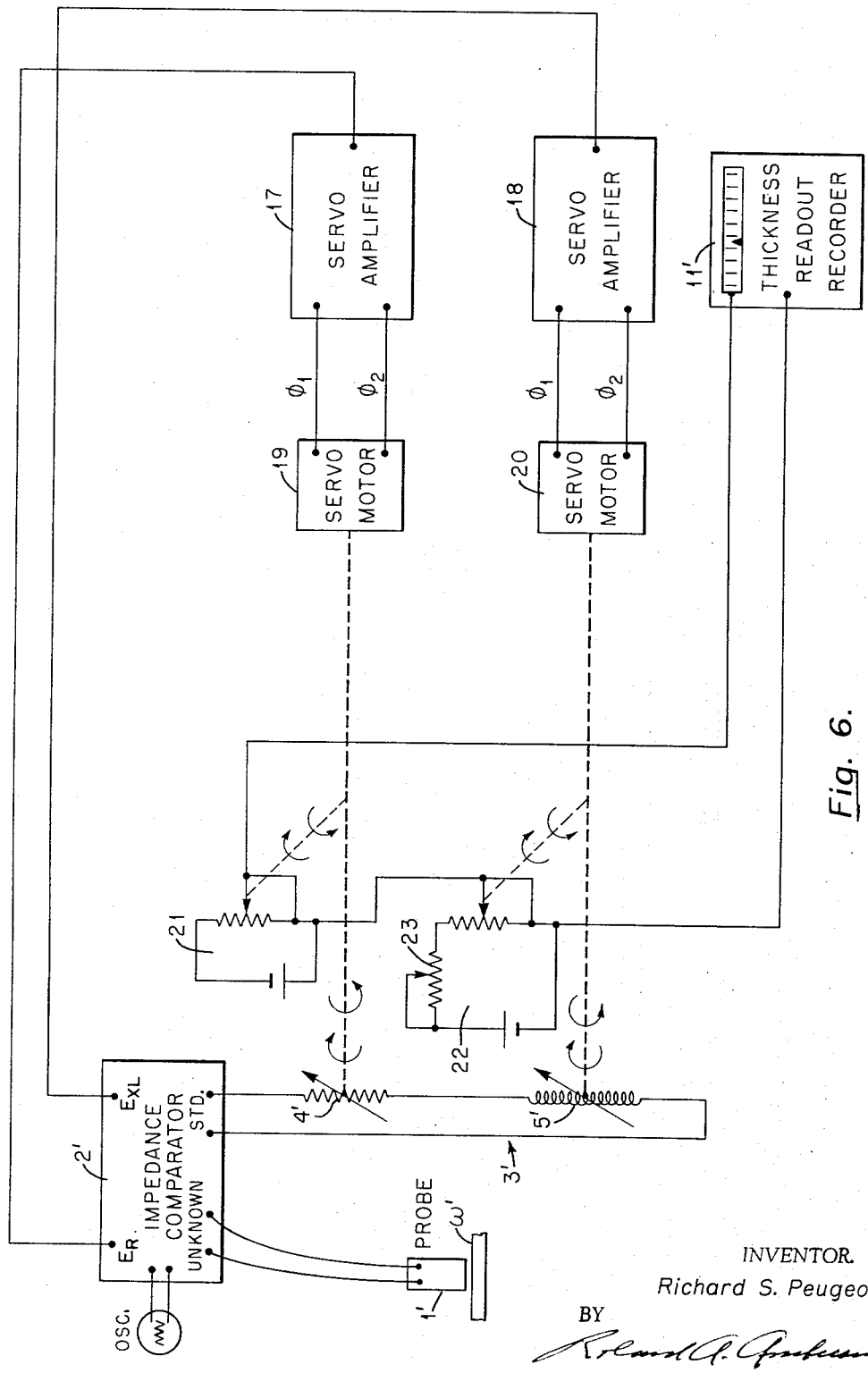

In the drawings, FIG. 1 is a typical eddy current probe, partly in section, employed to examine conductive specimens. FIG. 2 is an impedance plane plot with reactance plotted against resistance. FIG. 3 is an enlarged portion of the impedance plot of FIG. 2 showing the effect of rotating the plane with respect to the axis. FIG. 4 is a schematic of one form of applicant's improved eddy current testing system. FIG. 5 is a schematic of a preferred type of impedance comparator used in my improved eddy current test system. FIG. 6 is a schematic of a modified type of eddy current testing system.

Referring to the drawings in detail, and particularly to FIG. 1, a typical probe 1 has an outer housing 12 of cylindrical shape and preferably made of "Micarta" or other suitable material. Telescoped into its lower extremity is an inverted cup-shaped member 13 of magnetic material having a high permeability such as ferrite. Projecting downwardly from the central portion of the cup is a stem 14 about which is wrapped a coil of wire 15 to form a magnet. The ends of the wire pass up through the body of the probe and serve to couple the coil to the eddy current detector system, described hereinafter. For testing, the probe 1 is placed in close proximity to a surface of the specimen W to be tested.

The impedance of the above-mentioned probe coil can be considered to be a resultant of two components having a phase displacement of 90°. As shown in the complex impedance plane plot of FIG. 2, one of these is an imaginary component $jWL$ called inductive reactance and the other is a real component R which represents resistance. Each of the points shown in FIG. 2 represents a measured impedance value. Point A, for example, represents a probe coil impedance which is the resultant of a normalized inductive reactance of 30 and a normalized resistance of 50. "Normalized" as used herein means that a value of say 30 on either axis represents 30% of the maximum value represented by the axis.

The data presented in FIG. 2 are based on a series of experiments in which the inventor used an eddy current probe to measure the wall thickness of various uranium workpieces, the probe coil being positioned close to, but not in contact with, one surface of the workpiece under examination. In making these measurements the inventor encountered the problem mentioned above, i.e., the problem of minimizing the effect on the probe coil impedance of variations in the spacing between the probe coil and the workpiece.

FIG. 2 illustrates the adverse effect of even slight variations in probe-to-workpiece spacing, termed "lift-off." It will be noted that the graph includes (1) a number of dashed lines, each representing an actual wall thickness, and (2) a number of solid lines each representing a given amount of "lift-off."

Referring to the solid line labeled "zero lift-off," note that Point E represents the probe impedance corresponding to a wall thickness of 0.065 inch. The value of this normalized impedance can be represented by a vector drawn from O to E. If now the lift-off is changed from zero to 0.010 inch, but all other conditions are maintained the same, the normalized probe impedance shifts to a new value represented by Point P, which is represented by a vector drawn from O to P. This shift in probe impedance is reflected in a change in the indicated thickness of the workpiece, although, of course, the thickness has not changed. Thus, it is important that the effect of changes in lift-off be minimized.

FIG. 4 illustrates a system which includes the standard single-coil eddy current probe 1 of FIG. 1 and an impedance-comparison bridge 2, such as the General Radio Impedance Comparator, Model 1605–AH. This bridge is provided with terminals for connection of the probe 1 and other terminals for the connection of a series circuit 3 comprising a standard resistance 4 and a standard inductance 5. The bridge is adapted to compare the impedances of the probe coil and the series circuit 3, and to generate two output signals—a signal voltage $E_R$ proportional to the difference in the resistive components of the two impedances and a signal voltage $E_{XL}$ proportional to the difference in the inductive reactance components of the two impedances. As shown, conventional amplifiers 6 and 7 are provided for the output signals $E_{XL}$ and $E_R$, respectively. The amplified signal $E_R$ and the amplified signal $E_{XL}$ are combined additively by impressing them across a series circuit 8 comprising a standard potentiometer 9 and a standard resistor 10. As shown, the signal $E_R$ is impressed across the potentiometer; $E_{XL}$ is impressed across the resistor. A standard recorder 11 is connected to the slider of the potentiometer and to an end of the resistor to receive the sum of $E_{XL}$ and the tapped-off fraction of $E_R$.

The function of the conventional impedance-comparison bridge 2 used in the system of FIG. 4 can best be understood by referring to the block diagram of FIG. 5 wherein amplifiers $A_1$ and $A_2$ feed two separate detectors $D_1$, $D_2$. The bridge proper includes a transformer T whose primary $T_1$ is coupled to an oscillator and whose secondaries $T_2$, $T_3$ form two legs of the bridge. The third leg $Z_1$ is a standard inductance and resistance and corresponds to 3 of FIG. 4. The probe 1 is the fourth leg $Z_2$. Detector $D_1$ is fed from the bridge through amplifier $A_1$ at zero phase, and detector $D_2$ is fed from a sub-network through amplifier $A_2$ which is 90° out of phase with respect to $D_1$. Detector $D_1$, which is referenced to the oscillator phase, produces a signal proportional to changes in the resistive part of the circuit. Detector $D_2$ which is taken across a 90° phase shift network will give an output proportional to changes in the inductive part of the circuit.

The detectors $D_2$ and $D_1$ are networks which include rectifiers for converting A.C. signals to D.C. Circuit $A_2D_2$ and circuit $A_1D_1$ both measure impedance, but due to the coupling of circuit $A_2D_2$ through a resistance capacitance network 16, these two circuits are out of phase by 90°. Although both circuits measure impedance, a change in reactance has more influence on circuit $A_2D_2$ since this circuit has the 90° phase shift and is nearer to being in phase with it. Changes in resistance, however, will have greater effect on the zero phase shift circuit of $A_1D_1$ because the resistance component is nearer in phase with that circuit.

If the charts of FIGS. 2 and 3 can be oriented so that the lift-off curve is at right angles to the thickness scale, then there should be no interaction and the effect of lift-off may become negligible over a limited range. However, since the dash line of .065 inch of FIG. 2 is not a straight line, and it is rotated so that vector P–E is 90° with respect to the vector whose length is being measured, then the balance of the dash line (curve) would not be at 90° but will have some component along the thickness vector and would have some influence on the resulting measurements. Therefore, such adjustment must be changed when this range is exceeded.

In a typical calibration of the circuit of FIG. 4, the probe coil 1 is brought into operating relation with one of several workpieces whose thickness is to be measured. A series circuit 3 having an impedance in the same general range as the workpiece W is connected to the "standard" terminals of the bridge 2. The slider of the potentiometer 9 is set on an intermediate position, and the bridge then is energized to generate the error voltages $E_R$ and $E_{XL}$. The error voltages are amplified and are impressed, respectively, across the potentiometer 9 and the resistor 10. The recorder 11 now reads a value proportional to the sum of $E_{XL}$ and the tapped-off fraction of $E_R$, and will be referred to as the "original" recorded value.

At this point it should be emphasized that what is being measured is not the vector OP of FIGS. 2 and 3. Instead, the ordinate and abscissa of the selected point is being measured along the X and Y axes of the chart by measuring the voltages which are 90° out of phase with each other. In theory, if the abscissa and ordinate lengths are known and form the two sides of a right triangle, then the length of the third side, which is the vector OP is the square root of the sum of the squares of the ordinate and abscissa. However, in practice, applicant converts the two A.C. signals which are 90° out of phase into D.C. voltage signals whose amplitudes corresponds to the reactive and resistive components of the A.C. voltage, and combines them algebraically. Thus, in network 9, 10 the voltage $E_{XL}$ which is proportional to the reactive drop, is added to a portion of the voltage $E_R$ which is proportional to the resistance drop. Addition of these components algebraically give a signal which is a function of, but, of course, is not a true measure of the actual impedance drop. It does, however, provide an indication of the magnitude of vector OP.

In a manual calibration of the system, the operator notes the recorder reading, and simulates a change in lift-off by changing the spacing between the probe coil and the workpiece by a small amount. This, of course changes both $E_{XL}$ and $E_R$, and, therefore, the recorder reading. The operator then adjusts the potentiometer 9 to alter the abscissa and stretch or compress $E_R$ as required, to restore the recorder to its original value. In this calibration the operator may need to carry out several adjustments of potentiometer 9 to attain the proper compromise approximation to make the performance uniform over a given area, since this adjustment tilts the line which represents the locus of all points whose sum is the same by changing the abscissa. The system now is relatively insensitive to lift-off variations over a given range of thickness. For example, in a system designed as shown in FIG. 4 and calibrated for a given thickness range as described, a lift-off variation of ±0.004 inch produced no change in the recorder reading over a 10-mil range of thickness. In this system the bridge operating frequency was 10,000 c.p.s., and the sensitivity of the recorder was adjusted to give full-scale deflection for a 0.010 inch thickness change.

As mentioned above, this method provides good compensation over a limited range of thickness. If workpieces falling in a different thickness range X are to be examined, it is a simple matter to recalibrate the system by repeating the above-outlined procedure with one of the workpieces having a thickness in the range X. Moreover, the system can be easily modified to incorporate automatic re-calibration. In a more elaborate form of the system, for example, a manual switching means (not shown) may be provided to connect any one of a series of standard impedance circuits 3 to the "standard" terminals of the bridge 1. This permits the operator to select a standard impedance in the same general range as the workpiece under inspection, so that the recorder 11 will not be driven off scale. For a given setting of the impedance selector switch there will be a corresponding setting of the potentiometer 9 which will ensure good lift-off compensation. Once these corresponding values have been determined empirically, the potentiometer can be ganged to the impedance selector to ensure that good compensation is attained over a wide range of thickness.

Referring again to FIG. 2, it was previously mentioned that in the conventional non-contact eddy current test system, a change in lift-off produces a change in the output reading which cannot be distinguished from a change in the workpiece property under examination. The effect of a shift in lift-off is illustrated by the appreciable difference in the length of the vectors OE and OP. In applicant's system the outputs of both the resistive and reactive components are amplified and then the output proportional to the resistive component R is attenuated, which in effect contracts the R axis of the impedance plane. As illustrated in FIG. 3, this expands the characteristic curve, i.e., the constant-thickness and constant lift-off curves, and rotates them with respect to the point of origin O. As indicated, the curves can be rotated to a position where, over a limited range, at least, the magnitude of the impedance vector changes vary little with lift-off. In other words, after rotation the slope of the lift-off line is such that changes in XL and R essentially offset each other. Referring to the constant-thickness line representing 0.065 inch, for example, the lengths of the vectors OP and OP" are almost identical, although these vectors correspond to different lift-offs. As described previously, the system can be re-calibrated very simply to optimize the lift-off compensation for a given range of thickness.

The above-mentioned rotation of the characteristic curves to achieve lift-off compensation can be accomplished not only by changing the R axis with the potentiometer 9 of FIG. 4, but, alternatively, by changing the jWL axis with an appropriate adjustment, as with a potentiometer. Moreover, the method is not limited to a system of the character of FIG. 4, but may be practiced with a system such as that of FIG. 6. In FIG. 6, probe 1' is shown examining workpiece W' and is coupled to impedance comparator 2' along with standard impedance 3' having adjustable resistance 4' and adjustable reactance 5'. The output of comparator 2' feeds the resistive error signal to servo amplifier 17 and the inductive error signal to servo amplifier 18. These servo amplifiers operate servo motors 19 and 20, respectively, to adjust compensating networks 21 and 22 and the standard resistance 4' and inductance 5'.

The above system has worked satisfactorily on thickness up to 100 mils. In its operation, the standard impedance 3' consisting of series connected resistor 4' and inductance 5' is adjusted to balance the impedance comparator bridge 2' by means of servo motors 19, 20 which derive their actuating signals through servo amplifiers 17, 18 which derive their actuating signals from the resistive and reactive values of unbalanced voltages of the bridge 2'. The values of the inductance and the resistance required to restore the bridge to a balanced condition are read out from networks 21, 22 as analog voltages which are linear functions of the servo shaft rotation. After suitable gain adjustment the resistive and inductive analog voltages are subtracted and read out on a recorder 11'. By adjusting the relative gain of one of the analog voltages with potentiometer 23, it is possible to rotate the jWL and R axis to facilitate lift-off compensation. The recorder indication is then a non-linear function of thickness.

Having thus described my invention, I claim:

1. An eddy current tester for conductive samples comprising an impedance bridge, a source of constant voltage and frequency coupled to said bridge, an eddy current probe forming a leg of said bridge for positioning in close proximity to a conductive sample to produce eddy currents therein, a standard impedance forming another leg of said bridge, said bridge comparing said standard impedance with the impedance of said probe to provide separated outputs of the reactive and resistive components of unbalance of said impedance bridge, a combining network, circuit means for separately coupling said bridge outputs to said combining network, a read-out device, and means for feeding one component output and a selected, predetermined portion of the other component output from said combining network to said read-out device to compensate for the effect of any slight variations in probe-to-sample spacing during inspection of the conductive sample.

2. The eddy current tester set forth in claim 1, wherein said combining network comprises a voltage divider having one portion thereof coupled to one of said bridge outputs and another portion thereof coupled to the other of said bridge outputs by said circuit means, one portion of said voltage divider being an adjustable potentiometer to provide said selected portion of the component output to said read-out device.

3. An eddy current tester for conductive specimens comprising an impedance bridge, an A.C. source of constant frequency coupled to said bridge, an eddy current probe forming a part of the bridge for positioning near a conductive sample to produce eddy currents therein and responsive to the eddy current field generated to unbalance the bridge, a standard impedance having adjustable inductive and resistance elements therein and forming a part of said bridge to restore balance thereto, a pair of servos, means for separating and coupling the reactive and resistive components of the unbalanced signal from the bridge to said respective servos, a pair of adjustable, voltage networks, means for mechanically coupling one of said pair of networks to one of said pair of servos to adjust the output of said one network, means for mechanically coupling the other of said pair of networks to the other of said pair of servos to adjust the output of said other network, means for also mechanically coupling said one of said servos to said adjustable inductive element and means for also mechanically coupling said other of said servos to said adjustable resistive element to restore balance in said bridge, one of said voltage networks including means to selectively adjust the gain thereof, and a read-out device coupled to the combined outputs of said voltage networks to indicate sample thickness, said gain adjustment means being utilized to minimize the effect of any slight variations in probe-to-sample spacing during inspection of the conductive sample.

References Cited

UNITED STATES PATENTS

| | | | |
|---|---|---|---|
| 2,914,726 | 11/1959 | Harmon | 324—37 |
| 2,928,043 | 3/1960 | Fuerster | 324—40 X |
| 2,939,073 | 5/1960 | Eul | 324—40 X |
| 2,945,176 | 7/1960 | Irwin | 324—40 X |
| 2,965,840 | 12/1960 | Renken et al. | 324—40 X |
| 2,985,824 | 5/1961 | Renken | 324—40 |
| 3,159,784 | 12/1964 | Haslett et al. | 324—40 X |
| 3,197,693 | 7/1965 | Libby | 324—40 |
| 3,229,197 | 1/1966 | Renken | 324—40 |

RUDOLPH V. ROLINEC, *Primary Examiner.*

S. B. GREEN, R. J. CORCORAN, *Assistant Examiners.*